United States Patent [19]

Yabune et al.

[11] 4,209,340
[45] Jun. 24, 1980

[54] CELLULOSE ESTER RESIN COMPOSITION

[75] Inventors: Hideo Yabune; Masami Nambu, both of Himeji, Japan

[73] Assignee: Daicel Ltd., Osaka, Japan

[21] Appl. No.: 881,628

[22] Filed: Feb. 27, 1978

[30] Foreign Application Priority Data

Mar. 14, 1977 [JP] Japan .................................. 52-27866

[51] Int. Cl.$^2$ ................................................ C08L 1/10
[52] U.S. Cl. ...................................... 106/176; 106/177
[58] Field of Search ...................... 106/177, 176, 18.18; 260/927 R, 930

[56] References Cited

U.S. PATENT DOCUMENTS

| | | | |
|---|---|---|---|
| 3,053,878 | 9/1962 | Friedman et al. | 260/927 R |
| 3,139,450 | 6/1964 | Friedman | 106/177 |
| 3,484,506 | 12/1969 | Baranaukas et al. | 260/930 |

FOREIGN PATENT DOCUMENTS

943731 12/1963 United Kingdom ................ 260/927 R

*Primary Examiner*—Theodore Morris
*Attorney, Agent, or Firm*—Blanchard, Flynn, Thiel, Boutell & Tanis

[57] ABSTRACT

A resin composition comprising an organic acid ester of cellulose, as a resin component, and at least one member selected from organic phosphite compounds having the formulae (i) and (ii):

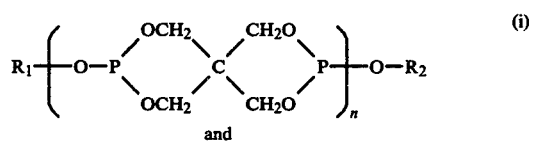

and

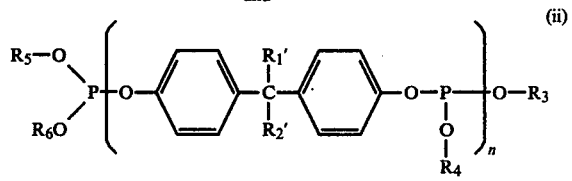

wherein $R_1$, $R_2$, $R_3$, $R_4$, $R_5$ and $R_6$, which can be the same or different, each is hydrogen, alkyl, aryl, alkylaryl, arylalkyl, alkoxyaryl, alkoxyalkyl, polyalkoxyalkyl, polyalkoxyaryl or polyaryloxyalkyl groups, with the proviso that one of $R_1$ and $R_2$ and one or two of $R_3$, $R_4$, $R_5$ and $R_6$ can be hydrogen, and $R_1'$ and $R_2'$, which can be the same or different, each is hydrogen or alkyl, aryl, alkoxyalkyl, aryloxyalkyl, alkoxyaryl, arylalkyl, alkylaryl, polyaryloxyalkyl, polyalkoxyalkyl and polyalkoxyaryl groups, and n is a number of at least 1, preferably 1 to 5.

11 Claims, No Drawings

CELLULOSE ESTER RESIN COMPOSITION

BACKGROUND OF THE INVENTION

Field of the Invention

The present invention relates to a resin composition containing an organic acid ester of cellulose, as a resin component. It is a primary object of the present invention to provide, at a low cost, a cellulose organic acid ester resin composition which is colorless and transparent and which is not appreciably discolored or deteriorated in its physical properties by the effects of heat to which the composition is exposed during the step of compounding and forming pellets thereof or during the step of molding the pellets by extrusion or injection.

Organic acid cellulose esters such as cellulose acetate are generally called "cellulose organic acid esters" or "fatty acid cellulose esters." In the instant specification, they are called "cellulose organic acid esters."

SUMMARY OF THE INVENTION

In accordance with the present invention, there is provided a cellulose organic acid ester composition comprising a cellulose organic acid ester and, incorporated therein, at least one member selected from organic phosphite compounds having the following formulae (i) and (ii):

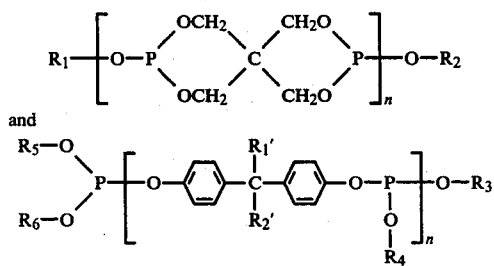

wherein $R_1$, $R_2$, $R_3$, $R_4$, $R_5$ and $R_6$, which can be the same or different, each is hydrogen, alkyl, aryl, alkylaryl, arylalkyl, aryloxyalkyl, alkoxyaryl, alkoxyalkyl, polyalkoxyalkyl, polyalkoxyaryl or polyaryloxyalkyl, with the proviso that one of $R_1$ and $R_2$ and one or two of $R_3$, $R_4$, $R_5$ and $R_6$ can be hydrogen, and $R_1'$ and $R_2'$, which can be the same or different, each is hydrogen, alkyl, aryl, alkoxyalkyl, aryloxyalkyl, alkoxyaryl, arylalkyl, alkylaryl, polyaryloxyalkyl, polyalkoxyalkyl or polyalkoxyaryl, and n is a number of at least 1, preferably 1 to 5.

The amount of said formula (i) or formula (ii) compound, or mixtures of said compounds, preferably is from about 0.01 to about 1 part by weight, per 100 parts by weight of the cellulose organic acid ester.

Cellulose organic acid esters, which are the principal ingredients of cellulose organic acid ester resins, such as cellulose acetate resins, cellulose acetate butyrate resins and cellulose acetate propionate resins, are usually prepared by using sulfuric acid as a catalyst. The sulfuric acid reacts with the hydroxyl groups of cellulose to form a sulfuric acid ester. This bonded sulfuric acid and any free sulfuric acid remaining in the composition, such as in the fiber texture, of the resulting resin are isolated and removed as much as possible by a boiling and stabilizing treatment. However, very minute amounts of the sulfuric acid ester and free sulfuric acid remain in the cellulose organic acid ester and they are the main causes of thermal deterioration of the cellulose organic acid ester, such as thermal discoloration and decomposition and breakage of the molecular chain. Accordingly, a neutralization treatment is ordinarily carried out with salts of weak acids, such as the acetates, carbonates and oxalates of potassium, sodium, calcium, barium or the like, whereby the cellulose organic acid ester is stabilized. However, when cellulose organic acid esters are manufactured on an industrial scale, these salts of weak acids are frequently added in excessive amounts, and they remain in the composition without being bonded to the sulfuric acid ester or free sulfuric acid. Accordingly, even if such deterioration as decomposition and breakage of the molecular chain can be prevented thereby, these residual salts exhibit a catalytic activity for the formation of coloring substances, and therefore, there occurs the disadvantage that the hue of the composition is drastically degraded.

The starting cellulose used to prepare a cellulose organic acid ester is derived from a natural substance such as linter pulp and contains various impurities that cause discoloration. In order to remove these discoloration-causing substances, it is necessary to perform various treatments such as a bleaching treatment, a high-temperature high-pressure treatment and a filtration treatment, during the process of refining the linter pulp or the process of preparing the cellulose organic acid ester. Further, a cellulose organic acid ester resin generally contains a plasticizer and further, a pigment or dye, a lubricant, a filler and other additives. Accordingly, the influences of heat on these additives should be taken into consideration.

Conventionally, discoloration and degradation of physical properties in cellulose organic acid ester resins caused by the influence of heat have been prevented by incorporating appropriate stabilizers therein. For example, as stabilizers heretofore used for cellulose organic acid esters, there can be mentioned weak organic acids, epoxy compounds, amine compounds, phenol compounds, sulfur compounds, phosphites, phosphonates and thiophosphites.

It is well-known that an important discoloration-preventing effect can be attained by incorporating an organic phosphite compound in a cellulose organic acid ester resin. However, this additive also has the effect of cutting the molecular chain of the cellulose organic acid ester during the hot molding step. Accordingly, the degree of polymerization of the cellulose ester is reduced, which promotes deterioration of its physical properties. Therefore, an additive of this type is used in combination with another stabilizer in order to prevent reduction of the degree of polymerization. However, since the organic phosphite compounds customarily used have a very high activity of promoting reduction of the degree of polymerization in cellulose organic acid esters, when they are used, a cellulose organic acid ester resin, as is desired in the present invention, namely, a cellulose organic acid ester resin which is colorless and transparent and in which discoloration during the hot molding step and reduction of the degree of polymerization are controlled to very low levels, cannot be obtained at all.

As a result of our investigations, it was found that among the conventional organic phosphite compounds, only trisnonylphenyl phosphite is relatively low in its activity of reducing the degree of polymerization and it is excellent in its resistance to degradation of the physical properties of cellulose organic acid esters. However, this compound is inferior to other organic phosphite compounds with respect to its discoloration-preventing effect. Under such circumstances, we made investigations with a view to finding organic phosphite compounds that have a high effect of preventing discoloration during the hot molding step and a much reduced tendency to promote reduction of the degree of polymerization in cellulose organic acid esters. As a result, we have now completed the present invention.

More specifically, the present invention relates to a cellulose organic acid ester resin composition comprising a cellulose organic acid ester resin, having incorporated therein, at least one member selected from organic phosphite compounds having the following formulae (i) and (ii):

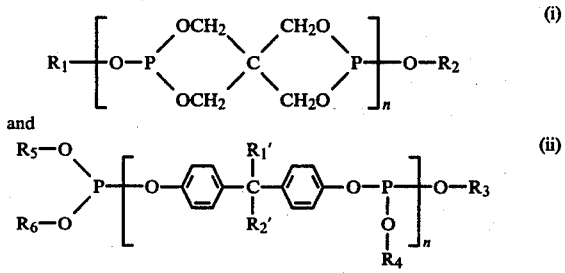

wherein $R_1$, $R_2$, $R_3$, $R_4$, $R_5$ and $R_6$, which can be the same or different, each is hydrogen, alkyl, aryl, alkylaryl, arylalkyl, aryloxyalkyl, alkoxyaryl, alkoxyalkyl, polyalkoxyalkyl, polyalkoxyaryl or polyaryloxyalkyl, with the proviso that one of $R_1$ and $R_2$ and one or two of $R_3$, $R_4$, $R_5$ and $R_6$ can be hydrogen, and $R_1'$ and $R_2'$, which can be the same or different, each is hydrogen, alkyl, aryl, alkoxyalkyl, aryloxyalkyl, alkoxyaryl, arylalkyl, alkylaryl, polyaryloxyalkyl, polyalkoxyalkyl or polyalkoxyaryl, and n is a number of at least 1, preferably 1 to 5.

The formula (i) and formula (ii) organic phosphite compounds are disclosed in U.S. Pat. No. 3,047,608 and Japanese Patent Publication No. 9743/65. However, it is quite surprising to find that these formula (i) and formula (ii) organic phosphite compounds are clearly distinguished from other organic phosphite compounds with respect to their unexpectedly high effect of preventing discoloration in cellulose organic acid ester resins during the hot molding step and their especially reduced tendency to promote reduction of the degree of polymerization in these cellulose ester resins.

In the present invention, it is preferred that the formula (i) or formula (ii) organic phosphite compound is incorporated in the resin composition in an amount of from 0.01 to 1 part by weight, especially from 0.05 to 0.8 part by weight, per 100 parts by weight of the cellulose organic acid ester. When the amount incorporated of the formula (i) and formula (ii) organic phosphite compound is too small, no substantial effect of preventing discoloration during the hot molding step can be obtained. As the amount incorporated of these organic phosphite compounds is increased, the effect of preventing discoloration during the hot molding step is gradually enhanced, but if the amount exceeds a certain critical level, the effect of preventing discoloration during the hot molding step is not improved any more. If the amount incorporated of these organic phosphite compounds is further increased, the effect of preventing discoloration during the hot molding step is rather reduced and the tendency to promote reduction of the degree of polymerization is increased. Accordingly, it is not preferred to incorporate these formula (i) and formula (ii) organic phosphite compounds in amounts above or below the above-mentioned range.

When the formula (i) and formula (ii) organic phosphite compounds, that are used in the present invention, are manufactured on an industrial scale, not all of the groups $R_1$, $R_2$, $R_3$, $R_4$, $R_5$ and $R_6$ need always be alkyl, aryl, alkylaryl, arylalkyl, aryloxyalkyl, alkoxyaryl, alkoxyalkyl, polyalkoxyalkyl, (polyalkoxy)aryl and (polyaryloxy)alkyl groups, and no particular disadvantage is brought about if some of these groups form free hydroxyl groups. Namely, one of $R_1$ and $R_2$ or one or two of $R_3$ to $R_6$ can be hydrogen.

The catalyst and acid component used for the synthesis are left in the formula (i) or formula (ii) organic phosphite compound that is used in the present invention. Since these impurities have bad influences that prevent attaining the intended effects of the present invention, it is preferred to remove these impurities as much as reasonably possible in industrial scale operation. In the organic phosphite compound that is used in the present invention, it is preferred that $R_1$, $R_2$, $R_3$, $R_4$, $R_5$ and $R_6$ be selected from alkyl, aryl, alkylaryl, arylalkyl, aryloxyalkyl, alkoxyaryl, alkoxyalkyl, polyalkoxyalkyl, (polyalkoxy)aryl and (polyaryloxy)alkyl groups having 6 to 23 carbon atoms. When the carbon number is too small, the hydrolyzability of the organic phosphite compound per se is very high, and if the carbon number is too large, the compatibility thereof with the cellulose organic acid ester is lowered and good results are not obtained. In the formula (i) and formula (ii) compounds n is a number of at least 1, preferably 1 to 5. As the value of n becomes higher, the hydrolyzability is reduced, but the compatibility with the cellulose organic acid ester is increased.

In the present invention, it is possible to use a material having a low α-cellulose content, such as wood pulp, as the starting cellulose material for preparing the cellulose organic acid ester. Further, it is also possible to simplify the usual refining steps such as the bleaching treatment, the high-temperature high-pressure treatment and the filtration treatment steps. Therefore, according to the present invention, a cellulose organic acid ester resin having high heat resistance and good transparency can be obtained at a very low manufacturing cost.

Although the organic phosphite compound that is used in the present invention has a very high effect of preventing discoloration during the hot molding step and has a much reduced tendency to promote reduction of the degree of polymerization, it does not exhibit a substantial activity of improving the heat resistance or preventing oxidative degradation. Accordingly, it is preferred to use appropriate known thermal stabilizers and antioxidants such as epoxy compounds, thioethers, phenol compounds and amine compounds in combination with the organic phosphite compound.

The present invention will now be further described in detail by reference to the following illustrative Examples and Comparative Examples.

Comparative Examples 1 to 11 and Examples 1 to 11

In 100 parts by weight of cellulose acetate flakes (degree of acetylation = 55.0%, degree of polymerization = 160, ash content = 0.032%) were incorporated 40 parts by weight of diethyl phthalate, 0.4 part by weight of Epikote 815 (an epoxy compound manufactured by Shell Co.), and 0.25 part by weight of an organic phosphite as listed in Table I and II. The mixture was well blanded by an agitator (manufactured by Sanei Seisakusho) and was then dried at 65° C. for 15 hours. The dried compound was pelletized at 200° C. by a small extruder having a diameter of 30 mm. The pellets were molded into the shape of a plate having a thickness of 3 mm by a 1-ounce vertical injection molding machine, and the degree of discoloration was examined with the naked eye. In order to examine the degree of degradation of the physical properties, pellets were charged in a cylinder having a diameter of 20 mm and a depth of 40 mm and were retained in this cylinder at 210° C. for 15 minutes. Then, the degree of polymerization of the cellulose acetate resin was measured and the ratio of the reduction of the degree of polymerization was calculated from the original degree of polymerization of the cellulose acetate flakes.

The results obtained are shown in Tables I and II.

As will be apparent from these results, according to the present invention, by incorporating a specific organic phosphite compound, as a critical ingredient, into a cellulose organic acid ester resin, the hue of the resulting resin composition is highly improved and degradation of its physical properties owing to the effect of heat is not appreciably caused.

The foregoing experiments were made also in cellulose acetate propionate and cellulose acetate butyrate. The results obtained are substantially the same as those obtained in the aforementioned experiments.

Table 1

| Comparative Example No. | Organic Phosphite Compound | Hue-Improving Activity[1] | Ratio of Reduction of Degree of Polymerization |
|---|---|---|---|
| 1 | triphenyl phosphite | Δ | 35% |
| 2 | diphenyldecyl phosphite | | 90% |
| 3 | tridecyl phosphite | X | 91% |
| 4 | trilauryl thiophosphite | X | 84% |
| 5 | tris-(nonylphenyl) phosphite | Δ | 25% |
| 6 | diphenyl hydrogenphosphite | XX | 89% |
| 7 | heptakisdipropylene glycol triphosphite | X | 62% |
| 8 | poly(dipropylene glycol nonylphenyl phosphite) | | 58% |
| 9 | tris-p-phenylphenyl phosphite | XX | 30% |
| 10 | diaryl monoalkyl phosphite | | 83% |
| 11 | tris-cyclohexylphenyl phosphite | XX | 30% |

Note:
[1] ○○ : excellent hue-improving activity
Δ : relatively good hue-improving activity
X : no hue-improving activity
XX : hue is adversely affected by incorporation Table 2

| Example No. | Organic Phosphite Compound | Hue-Improving Activity[1] | Ratio of Reduction of Degree of Polymerization |
|---|---|---|---|
| 1 | diisodecylpentaerythritol diphosphite | ○○ | 21.3% |
| 2 | di-2-ethylhexylpentaerythritol diphosphite | ○○ | 21.0% |
| 3 | didodecylpentaerythritol diphosphite | ○○ | 14.3% |
| 4 | (C$_{15}$H$_{31}$O)$_2$P—O—C$_6$H$_4$—C(CH$_3$)$_2$—C$_6$H$_4$—O—P(OC$_{15}$H$_{31}$)$_2$ | ○○ | 18.3% |
| 5 | (PhO)(HO)P—O—C$_6$H$_4$—CH(CH$_3$)—C$_6$H$_4$—O—P(OPh)(OC$_{12}$H$_{25}$) | ○○ | 22% |
| 6 | (C$_{13}$H$_{27}$O)$_2$P—O—C$_6$H$_4$—C(CH$_3$)$_2$—C$_6$H$_4$—O—P(OC$_{13}$H$_{27}$)$_2$ | ○○ | 16% |
| 7 | (C$_{14}$H$_{29}$O)$_2$P—O—C$_6$H$_4$—C(Ph)(C$_2$H$_5$)—C$_6$H$_4$—O—P(OC$_{14}$H$_{29}$)$_2$ | ○○ | 19% |
| 8 | C$_{10}$H$_{21}$—C$_6$H$_4$—OP(OCH$_2$)$_2$C(CH$_2$O)$_2$PO—C$_6$H$_4$—C$_{10}$H$_{21}$ | ○○ | 19% |

Table 2-continued

| Example No. | Organic Phosphite Compound | Hue-Improving Activity[1] | Ratio of Reduction of Degree of Polymerization |
|---|---|---|---|
| 9 | $C_8H_{17}OC_2HCH_2$—OP(OCH$_2$, OCH$_2$)C(CH$_2$O, CH$_2$O)PO—CH$_2$C$_2$HOC$_8$H$_{17}$ | O O | 22.4% |
| 10 | RO—P(OR)—[O—⌬—C(CH$_3$)(CH$_3$)—⌬—O—P(OR)]$_n$—OR<br>n = 2.7<br>R = 10% $C_{12}H_{25}$, 20% $C_{13}H_{27}$, 10% $C_{14}H_{29}$ and 50% $C_{15}H_{31}$ | O O | 10.0% |
| 11 | R—[O—P(OCH$_2$, OCH$_2$)C(CH$_2$O, CH$_2$O)P]$_n$—OR<br>n = 2.0<br>R = 53% $C_{10}H_{21}$ and 47% $C_{11}H_{23}$ | O O | 12.0% |

Note:
[1] O O: very excellent hue-improving activity

The embodiments of the invention in which an exclusive property or privilege is claimed are defined as follows:

1. A resin composition comprising (A) a cellulose organic acid ester resin, as the principal resin component, said cellulose organic acid ester resin having blended therein a discoloration-preventing agent consisting of (B) one or a mixture of two or more compounds selected from organic phosphite compounds having the formulae (i) and (ii):

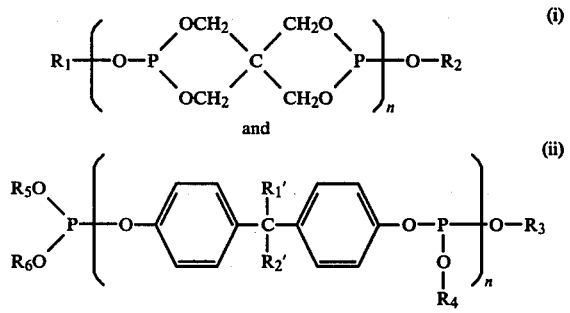

and wherein $R_1$, $R_2$, $R_3$, $R_4$, $R_5$ and $R_6$, which are the same or different, each is hydrogen, alkyl, aryl, alkylaryl, arylalkyl, aryloxyalkyl, alkoxyaryl, alkoxyalkyl, polyalkoxyalkyl, polyalkoxyaryl, or polyaryloxyalkyl, with the proviso that only up to one of $R_1$ and $R_2$ and only up to two of $R_3$, $R_4$, $R_5$ and $R_6$ can be hydrogen, and $R_1'$ and $R_2'$, which are the same or different, each is hydrogen, alkyl, aryl, alkoxyalkyl, aryloxyalkyl, alkoxyaryl, arylalkyl, alkylaryl, polyaryloxyalkyl, polyalkoxyalkyl or polyalkoxyaryl, and n is a number of at least 1, said composition containing from 0.01 to 1.0 parts by weight of said organic phosphite compound (B) per 100 parts by weight of said cellulose organic acid ester resin (A), said organic phosphite compound (B) being effective for minimizing discoloration of said cellulose organic acid ester resin (A) caused by heating the composition, while minimizing the decrease of the degree of polymerization of said cellulose organic acid ester resin (A).

2. A composition as set forth in claim 1 wherein $R_1$ and $R_2$ each is alkyl, aryl, alkylaryl, arylalkyl, aryloxyalkyl, alkoxyaryl, alkoxyalkyl, polyalkoxyalkyl, polyalkoxyaryl or polyaryloxyalkyl, each having 6 to 23 carbon atoms.

3. A composition as set forth in claim 1 wherein $R_3$, $R_4$, $R_5$ and $R_6$ each is alkyl, aryl, alkylaryl, arylalkyl, aryloxyalkyl, alkoxyaryl, alkoxyalkyl, polyalkoxyalkyl, polyalkoxyaryl or polyaryloxyalkyl, each having 6 to 23 carbon atoms.

4. A composition as set forth in claim 1 in which (B) consists of one or a mixture of two or more compounds having the formula (i).

5. A composition as set forth in claim 1 wherein the amount of said organic phosphite compound (B) is from 0.05 to 0.8 part by weight per 100 parts by weight of said cellulose organic acid ester resin (A).

6. A composition as set forth in claim 1 wherein said cellulose organic acid ester resin is cellulose acetate, cellulose acetate propionate or cellulose acetate butyrate.

7. A composition as set forth in claim 1 wherein n is a number of 1 to 5.

8. A composition as set forth in claim 1 in which $R_1'$ and $R_2'$ are selected from the group consisting of hydrogen, methyl ethyl and phenyl.

9. A composition as set forth in claim 8 in which $R_3$, $R_4$, $R_5$ and $R_6$ are selected from the group consisting of alkyl having 6 to 23 carbon atoms, phenyl and hydrogen.

10. A composition as set forth in claim 1 in which $R_1$ and $R_2$ are selected from the group consisting of alkyl having 6 to 23 carbon atoms and alkylphenyl having a total of up to 23 carbon atoms.

11. A composition as set forth in claim 1 in which (B) consists of one or a mixture of two or more compounds having the formula (ii).

* * * * *